United States Patent Office 2,895,379
Patented July 21, 1959

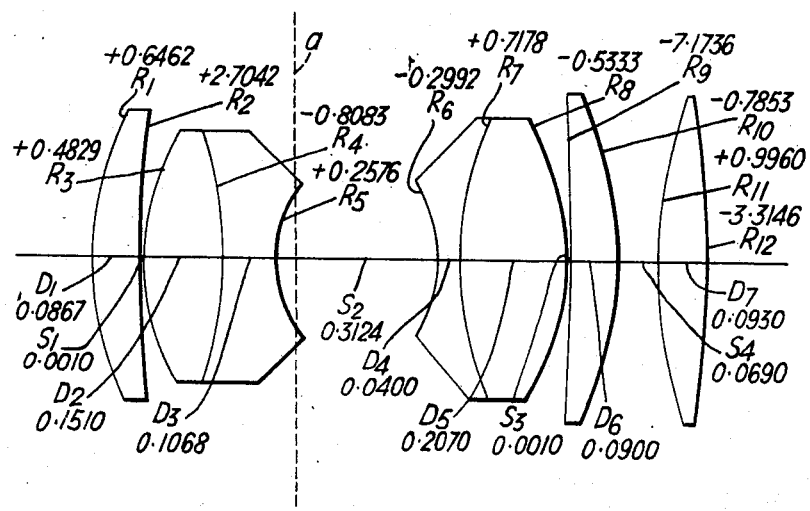
July 21, 1959    G. H. COOK ET AL    2,895,379
OPTICAL OBJECTIVES
Filed Dec. 17, 1956
Inventors
Gordon H. Cook
Peter A. Merigold
By
Attorneys

2,895,379

OPTICAL OBJECTIVES

Gordon Henry Cook and Peter Arnold Merigold, Leicester, England, assignors to Taylor, Taylor & Hobson Limited, Leicester, England, a British company Application December 17, 1956, Serial No. 628,582
Claims priority, application Great Britain December 30, 1955

18 Claims. (Cl. 88—57)

This invention relates to an optical objective corrected for spherical and chromatic aberrations, coma, astigmatism and distortion with respect to a stop position which lies within 0.2 F of the front focal point of the objective, where F is the equivalent focal length of the complete objective, and particularly intended although not limited thereto, for use as a projection objective.

The present invention has for its primary objective to provide an improved objective which, in addition to being well-corrected for the primary aberrations, is also well-corrected for oblique aberrations and for zonal spherical aberration without vignetting, so that a high standard of definition and uniformity of illumination are obtained over the whole angular field.

It should be made clear that the terms "front" and "rear" are herein used to refer to the sides of the objective respectively near to and further from the longer conjugate so that when the objective is used for projection, the light passes through the objective from the rear to the front.

The objective according to the present invention has an overall axial length which lies between 0.85 F and 1.5 F and comprises a front member which comprises a simple collective component located in front of a compound dispersive meniscus component, and a rear member which has an equivalent focal length $f$ lying between 0.4 and 0.7 times the overall length of the complete objective and comprises a pair of axially spaced simple collective components located to the rear of a compound dispersive meniscus component, the two dispersive meniscus components having their air-exposed surfaces concave towards one another, the rear surface of the rear dispersive meniscus component having a radius of curvature which lies between 0.7 $f$ and 1.1 $f$.

The stop position of the objective is preferably located substantially at the front focal point of the objective, whereby the objective is telecentrically corrected, whilst such front focal point preferably lies within 0.25 $f$, of the vertex of the rear surface of the front dispersive meniscus component.

Preferably, the sum of the focal lengths of the two rear simple collective components lies between 2.7 $f$ and 6 $f$. The axial thickness of the rear dispersive meniscus component preferably lies between 0.3 $f$ and 0.55 $f$.

Preferably, the sum of the focal lengths of the two dispensive meniscus components lies between 2.8 F and 4.8 F and the Petzval sum over the surfaces of the objective lying between, and including, the front surface of the front dispersive meniscus component and the rear surface of the rear dispersive meniscus component has a negative value which lies numerically between 1.0 and 1.5 times the equivalent power of the complete objective. The two dispersive meniscus components are preferably doublets, and the optical powers of the internal contact surfaces of the front doublet and of the rear doublet respectively preferably lie between 0.01 and −0.03 times the equivalent power of the complete objective and between 0.09 and 0.03 times such equivalent power, the optical power of a surface being defined by the expression $n_1 - n/R$, where $n_1$ and $n$ are the mean refractive indices of the material respectively behind and in front of the surface, and R is the radius of curvature of the surface, reckoned for this purpose positive if the surface is convex to the front and negative if the surface is concave to the front.

The overall length of the rear member preferably lies between 0.7 $f$ and 1.0 $f$. The axial separation between the rear surface of the front dispersive meniscus component and the front surface of the rear dispersive meniscus component preferably lies between 0.4 and 0.75 times the sum of the numerical values of the radii of curvature of such two surfaces.

The focal length of the front member preferably lies between 1.5 F and 2.5 F, and the focal length of the front simple collective component preferably lies between 0.9 F and 1.6 F. The radius of curvature of the front surface of the front dispersive meniscus component preferably lies between 0.25 and 0.5 times the focal length of the front simple collective component.

The accompanying diagrammatic figure illustrates one convenient practical example of objective according to the invention, which is intended for use in the mirror-arc system of projection and is corrected with respect to a telecentric stop at the front focal point in the axial space between the two dispersive meniscus components, and numerical data for such example are given in the following table, in which $R_1$, $R_2$ . . . represent the radii of curvature of the individual surfaces (the positive sign indicating that the surface is convex to the front and the negative sign that it is concave thereto), $D_1$, $D_2$ . . . represent the axial thicknesses of the elements, and $S_1$, $S_2$ . . . represent the axial air separations between components. The table also gives the mean refractive indices $n_d$ for the $d$-line and the Abbé V numbers of the materials used for the elements of the objective.

The insertion of equals (=) signs in the radius columns of the tables, in company with the plus (+) and minus (−) signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the tables may have to be treated as negative for some calculations as is well understood in the art.

[Equivalent focal length 1.000    Relative aperture F/2.0.]

| Radius | Thickness or Air Separation | Refractive Index $n_d$ | Abbé V Number |
|---|---|---|---|
| $R_1 = +0.6462$ | $D_1 = 0.0867$ | 1.691 | 54.8 |
| $R_2 = +2.7042$ | $S_1 = 0.0010$ | | |
| $R_3 = +0.4829$ | $D_2 = 0.1510$ | 1.691 | 54.8 |
| $R_4 = -0.8083$ | $D_3 = 0.1068$ | 1.700 | 41.2 |
| $R_5 = +0.2576$ | $S_2 = 0.3124$ | | |
| $R_6 = -0.2992$ | $D_4 = 0.0400$ | 1.648 | 33.8 |
| $R_7 = +0.7178$ | $D_5 = 0.2070$ | 1.691 | 54.8 |
| $R_8 = -0.5333$ | $S_3 = 0.0010$ | | |
| $R_9 = -7.1736$ | $D_6 = 0.0900$ | 1.651 | 58.6 |
| $R_{10} = -0.7853$ | $S_4 = 0.0690$ | | |
| $R_{11} = +0.9960$ | $D_7 = 0.0930$ | 1.651 | 58.6 |
| $R_{12} = -3.3146$ | | | |

In this example, the telecentric stop position at the front focal plane of the objective, with respect to which the objective is corrected, is indicated by the broken line $a$ in the drawing and lies at a point 0.0267 F behind the rear surface of the front dispersive meniscus component. There need not be an actual stop at this point, for the image of the mirror used with the arc source of illumination can itself be used as a virtual stop. The overall length of the objective is 1.158 F. The back focal length of the objective is 0.424 F.

The front member of the objective, constituted by the simple collective front component and the front dispersive meniscus component, has equivalent focal length 1.984 F. The equivalent focal length of the simple collective front component is 1.208 F, and that of the front dispersive meniscus component is 1.416 F. It will be noted that the radius $R_3$ has a value 0.4829 F, that is 0.4 times the focal length of the simple collective front component.

The equivalent focal length $f$ of the rear member of the objective constituted by the rear dispersive meniscus component and the two rear simple collective components, is 0.598 F, which is 0.51 times the overall length of the objective. The front focal plane of the objective thus lies at a point 0.0446 $f$ behind the rear surface of the front dispersive meniscus component. The overall length of the rear member is 0.5 F, which is 0.84 $f$. The equivalent focal lengths of the fourth and fifth components, the the two rear simple collective components, are respectively 1.347 F and 1.187 F, and the sum of these focal lengths of 2.534 F, that is 4.24 $f$. The sum of the axial thicknesses of the two elements constituting the rear dispersive meniscus component is 0.247 F, that is 0.401 $f$. The radius $R_8$ has a value 0.5333 F, that is 0.89 $f$.

The sum of the numerical values of the radii $R_5$ and $R_6$ is 0.5568 F, and the axial separation $S_2$ between these surfaces is 0.56 times this sum. The equivalent focal length of the rear dispersive meniscus component is 2.462 F, so that the sum of the focal lengths of the two dispersive meniscus components is 3.787 F. The Petzval curvatures (that is for each surface the difference between the mean refractive indices of the materials on either side of the surface divided by the triple product of the radius of curvature of the surface and such two refractive indices) for the surfaces $R_3$, $R_4$, $R_5$, $R_6$, $R_7$ and $R_8$ are respectively +0.846/F, −0.004/F, −1.600/F, −1.314/F, +0.02/F and +0.766/F, so that the Petzval sum over these surfaces is −1.285/F.

The expression $(n_3-n_2)/R_4$ has the value −0.01/F and the expression $(n_5-n_4)/R_7$ has the value +0.06 F.

This example is well corrected for the primary aberrations and for oblique aberrations and zonal spherical aberration over a semi-angular field of 15 degrees. The high degree of correction for oblique aberrations enables the diameter of the rear member and especially of the two rear components to be made large without loss of definition so that good uniformity of illumination is ensured over the whole angular field and vignetting troubles are avoided. It may be mentioned in this connection that the diameters of the five components, in order from the front are 0.56 F, 0.49 F, 0.54 F, 0.64 F and 0.64 F, whilst the clear diameters of the surfaces $R_5$ and $R_6$ are respectively 0.293 F and 0.307 F.

It is to be appreciated that although the example above described relates to a projection objective, the objective may also be used for other purposes, in which case the aberrations of the objective may or may not be corrected with respect to a telecentric stop. Thus when the objective is intended for use as a photographic objective, the aberrations may be corrected with respect to an optical or mechanical stop located either within the front dispersive meniscus component or between the two dispersive meniscus components of the objective and the above described example may be modified so as to obtain the desired correction with respect to such stop position.

What we claim as our invention and desire to secure by Letters Patent is:

1. An optical objective corrected for spherical and chromatic aberrations, coma, astigmatism, field curvature and distortion, and having a stop position which lies within 0.2 F of the front focal point of the objective and with respect to which such aberrations are corrected, where F is the equivalent focal length of the objective, the objective having an overall axial length which lies between 0.85 F and 1.5 F and comprising two axially spaced members, of which the front member consists of a compound meniscus dispersive component having its air-exposed surfaces convex to the front and a simple collective component located in front of such compound component, whilst the rear member has an equivalent focal length $f$ lying between 0.4 and 0.7 times the overall axial length of the complete objective and consists of two simple collective components and a compound meniscus dispersive component located in front of such simple components, the rear surface of such compound component being concave to the front and having radius of curvature lying between 0.7 $f$ and 1.1 $f$, the front focal point lying within 0.25 $f$ of the vertex of the rear surface of the front dispersive meniscus component.

2. An optical objective as claimed in claim 1, in which the sum of the focal lengths of the two rear simple collective components lies between 2.7 $f$ and 6 $f$, and the axial thickness of the rear compound dispersive meniscus component lies between 0.3 $f$ and 0.55 $f$.

3. An optical objective as claimed in claim 1, in which the sum of the focal lengths of the two dispersive meniscus components lies between 2.8 $f$ and 4.8 $f$, and the Petzval sum over the surfaces of the objective lying between and including the front surface of the front dispersive meniscus component and the rear surface of the rear dispersive meniscus component has a negative value which lies numerically between 1.0 and 1.5 times the equivalent power of the complete objective.

4. An optical objective as claimed in claim 1, in which the two dispersive meniscus components are doublets, and the optical powers of the internal contact surfaces of the front doublet and of the rear doublet respectively lie between 0.01 and −0.03 times the equivalent power of the complete objective and between 0.09 and 0.03 times such equivalent power, the optical power of a surface being defined by the expression $(n_1-n)/R$ where $n_1$ and $n$ are the mean refractive indices of the material respectively behind and in front of the surface and R is the radius of curvature of the surface reckoned positive if the surface is convex to the front and negative if the surface is concave to the front.

5. An optical objective as claimed in claim 1, in which the overall axial length of the rear member lies between 0.7 $f$ and 1.0 $f$, and the axial separation between the front and rear members lies between 0.4 and 0.75 times the sum of the numerical values of the radii of curvature of the two surfaces bounding such separation.

6. An optical objective as claimed in claim 1, in which the sum of the focal lengths of the two rear simple collective components lies between 2.7 $f$ and 6 $f$.

7. An optical objective as claimed in claim 6, in which the sum of the focal lengths of the two dispersive meniscus components lies between 2.8 $f$ and 4.8 $f$, and the Petzval sum over the surfaces of the objective lying between and including the front surface of the front dispersive meniscus component and the rear surface of the rear dispersive meniscus component has a negative value which lies numerically between 1.0 and 1.5 times the equivalent power of the complete objective.

8. An optical objective as claimed in claim 6, in which the overall axial length of the rear member lies between 0.7 $f$ and 1.0 $f$, and the axial separation between the front and rear members lies between 0.4 and 0.75 times the sum of the numerical values of the radii of curvature of the two surfaces bounding such separation.

9. An optical objective as claimed in claim 1, in which the axial thickness of the rear compound dispersive meniscus component lies between 0.3 $f$ and 0.55 $f$.

10. An optical objective as claimed in claim 1, in which the axial thickness of the rear compound dispersive meniscus component lies between 0.3 $f$ and 0.55 $f$.

11. An optical objective as claimed in claim 1, in which the sum of the focal lengths of the two dispersive meniscus components lies between 2.8 $f$ and 4.8 $f$, and the Petzval sum over the surface of the objective lying between and including the front surface of the front dispersive meniscus component and the rear surface of the rear dispersive meniscus component has a negative value which lies numerically between 1.0 and 1.5 times the equivalent power of the complete objective.

12. An optical objective as claimed in claim 1, in which the two dispersive meniscus components are doublets, and the optical powers of the internal contact surfaces of the front doublet and of the rear doublet respectively lie between 0.01 and −0.03 times the equivalent power of the complete objective and between 0.09 and 0.03 times such equivalent power, the optical power of a surface being defined by the expression $(n_1-n)/R$ where $n_1$ and $n$ are the mean refractive indices of the material respectively behind and in front of the surfaces and R is the radius of curvature of the surface reckoned positive if the surface is convex to the front and negative if the surface is concave to the front.

13. An optical objective as claimed in claim 1, in which the two dispersive meniscus components are doublets, and the optical powers of the internal contact surfaces of the front doublet, and of the rear doublet respectively lie between 0.01 and −0.03 times the equivalent power of the complete objective and between 0.09 and 0.03 times such equivalent power.

14. An optical objective as claimed in claim 1, in which the overall axial length of the rear member lies between 0.7 $f$ and 1.0 $f$.

15. An optical objective as claimed in claim 1, in which the axial separation between the rear surface of the front dispersive meniscus component and the front surface of the rear dispersive meniscus component lies between 0.4 and 0.75 times the sum of the numerical values of the radii of curvature of such two surfaces.

16. An optical objective as claimed in claim 1, in which the focal length of the front member lies between 1.5 F and 2.5 F.

17. An optical objective as claimed in claim 1, in which the focal length of the front simple collective component lies between 0.9 F and 1.6 F.

18. An optical objective as claimed in claim 1, in which the radius of curvature of the front surface of the front dispersive meniscus component lies between 0.25 and 0.5 times the focal length of the front simple collective component.

References Cited in the file of this patent

UNITED STATES PATENTS

| | | |
|---|---|---|
| 2,012,822 | Lee | Aug. 27, 1935 |
| 2,019,985 | Lee | Nov. 5, 1935 |
| 2,398,680 | Warmisham | Apr. 16, 1946 |
| 2,718,173 | Hacman et al. | Sept. 20, 1955 |
| 2,735,339 | Doi | Feb. 21, 1956 |

FOREIGN PATENTS

| | | |
|---|---|---|
| 373,950 | Great Britain | June 2, 1932 |
| 522,651 | Great Britain | June 24, 1940 |
| 647,830 | Germany | July 14, 1937 |